UNITED STATES PATENT OFFICE.

JACQUES LOUIS KESSLER, OF CLERMONT-FERRAND, FRANCE.

PROCESS OF HARDENING PLASTER OR OTHER POROUS SUBSTANCES AND OF FIXING COLORS THEREON.

SPECIFICATION forming part of Letters Patent No. 687,567, dated November 26, 1901.

Application filed April 2, 1901. Serial No. 54,087. (No specimens.)

*To all whom it may concern:*

Be it known that I, JACQUES LOUIS KESSLER, a citizen of the Republic of France, residing in Clermont-Ferrand, France, have invented an Improved Process of Hardening Plaster or other Porous Substances and for Fixing Colors Thereon, of which the following is a specification.

No satisfactory results have so far been obtained in the employment of solutions of alkaline silicates for the hardening of plaster after its application by causing the plaster to absorb the solutions. The fault of the reaction of the alkaline silicates on plaster being to produce on the surface of the insoluble sulfate of lime a soluble alkaline salt would lead one to attempt at least not to aggravate it by adding more alkali. They have therefore carefully saturated the silicate to the fullest extent with silica, and then as the product thus obtained immediately enters the pores of the surface of the plaster they have only been able to harden a thin layer of this last entirely insufficient to increase its resistance. I have found the means of overcoming this obstacle by doing quite the contrary—that is to say, by employing a silicate surcharged with alkali, and by discovering that silicate supersaturated with potash does not leave excess of alkali in the plaster. By doubling the dose of alkali contained in the silicate I am able to penetrate the plaster to more than a centimeter of depth with a solution of silicate of potash at 15° or 20° Baumé and to transform thereby three or four millimeters of thickness into silicate of lime. The obtaining of this product possessing such a thickness has enabled me for the first time to recognize the great power of cohesion of silicate of lime precipitated from calcic sulfate, (plaster,) and I have applied the idea to cause adhesion together of powders of different foreign bodies, notably certain of them which the alkaline silicates have been unable to cause to adhere or harden—as chalk, pariswhite, (sulfate of barium,) &c. This difference in the fixation of carbonate of lime and of sulfate of lime by alkaline silicates illustrates the rapidity of decomposition of this latter compared with the slowness of decomposition of the former, which is such that the alkaline silicate is decomposed by carbonic acid of the air before having reacted upon the chalk. It is this rapidity of action which has particularly been demonstrated by the experiment before mentioned, in which I caused a solution of silicate to rapidly penetrate a centimeter in thickness of plaster and in which in spite of this rapidity the potash of the silicate was so speedily made insoluble that the liquid which was absorbed into the layer of plaster did not show the slightest trace of alkali below three millimeters to four millimeters of silicate of lime formed on its surface, the litmus remaining red below that. It suffices, therefore, to add to the powders which I wish to fix a fifth or a tenth of hydrated plaster or unburned plaster and to deposit them dry or in water upon any suitable surface, glass, plaster, previously hardened or made impermeable, stone, or cement, and then to moisten them in a pulverizer or otherwise with silicate of potash to make them adhere to each other or to the surface on which they are to be placed. If these powders are colored or employed as white colors, one thus obtains a new method of painting in silicates on plaster or with plaster. The function of the plaster here is not at all to take up the water, and thus affix the color, for the color can be deposited in pure water with the unburned plaster without any adhesion resulting.

First. To employ the alkaline silicates to harden plaster, I choose by preference silicate of potash, although I may employ also silicate of soda freed from sulfate of soda by brushing or washing when the soda crystallizes out on the surface. I take the solution at from 5° to 25° Baumé and I take care that it contains about two times more alkali than silicate saturated with silica. I can use a silicate more alkaline still. For some purposes also, especially for fixing colors, I can use a silicate containing much less alkali. Finally I may add such silicates to the water, which serve to temper the plaster before it is applied, in order to prevent the too-fine particles of this plaster from choking the pores. In any case I operate without heat.

Second. When employing alkaline silicates to harden powders mixed with hydrated plaster, I add a fifth to a tenth of this latter to these powders and I paint with them by known means, either after having mixed them with pure water, gummy water, paste, or with a solution of silicate more or less alkaline. This painting may be on plaster, hardened or not, glass, stone, cement, mortar, or rough cast, or even on wood, theater decorations, or any other kind of surface.

I claim as my invention—

1. The mode described of hardening plaster and rendering it impermeable, said mode consisting in subjecting the plaster to the action of solutions of silicates surcharged with alkali, substantially as described.

2. The mode herein described of hardening plaster powders and causing them to adhere, said mode consisting in subjecting the plaster to the action of silicate solutions surcharged with alkali, substantially as described.

In testimony whereof I have signed my name to this specification in the presence of two subscribing witnesses.

JACQUES LOUIS KESSLER.

Witnesses:
A. LUMENT,
DELARNELL.